United States Patent [19]
Beale

[11] Patent Number: 5,923,329
[45] Date of Patent: Jul. 13, 1999

[54] METHOD OF GRID GENERATION ABOUT OR WITHIN A 3 DIMENSIONAL OBJECT

[75] Inventor: Steven Beale, Ottawa, Canada

[73] Assignee: National Research Council of Canada, Ottawa, Canada

[21] Appl. No.: 08/881,116

[22] Filed: Jun. 24, 1997

Related U.S. Application Data

[60] Provisional application No. 60/020,360, Jun. 24, 1996.

[51] Int. Cl.$^6$ .................................................. G06T 15/00
[52] U.S. Cl. ........................................ 345/418; 345/419
[58] Field of Search .................... 345/418, 419, 345/420, 423, 424

[56] References Cited

U.S. PATENT DOCUMENTS 5,303,337  4/1994  Ishida ........................................ 345/419
5,386,500  1/1995  Pomerantz et al. ....................... 345/419
5,793,371  8/1998  Deering ..................................... 345/418

*Primary Examiner*—Phu K. Nguyen
*Assistant Examiner*—Cliff N. Vo
*Attorney, Agent, or Firm*—Neil Teitelbaum & Associates

[57] ABSTRACT

A method to generate body-fitted grids, based on the direct solution for three scalar functions, is derived. The grid is re-meshed, based on the solution, using a grid-correction procedure. Calculations are performed for a variety of problems with both Dirichlet and Neumann boundary conditions, involving the use of non-linear source-terms, and other techniques to effect grid-control. According to the described method, a current grid and reference scalars are provided. The values at nodes within the current grid are calculated and compared with the reference values. The nodes on the current grid are moved until the values calculated and the reference scalars are within predetermined tolerances. The current grid represents the desired reference grid. Such a method is useful in grid boundary evaluation and modification as well as in grid adaptation.

20 Claims, 8 Drawing Sheets

METHOD OF GRID GENERATION ABOUT OR WITHIN A 3 DIMENSIONAL OBJECT

This application claims benefit of provisional application Ser. No. 60/020,360 filed Jun. 24, 1996.

FIELD OF THE INVENTION

This invention relates generally to computer aided design and more particularly to the generation of grids representing multi-dimensional spaces for use in computational fluid dynamics in computer aided design.

BACKGROUND OF THE INVENTION

In computer aided design, a designer has the ability to verify and modify many aspects of a design prior to implementation. This is important during initial design stages as well as during redesign or modification.

Such a design process begins with requirements and drawings. The drawings allow for artistic elements to be incorporated into designs of objects such as those for automobiles, buildings, boats, etc. The drawings are then transformed into computer models using computer aided design tools. These models are analysed to ensure adherence to design parameters. Returning to our example of an automobile, static parameters such as interior space, head room, wheel base, engine room, and trunk space are evaluated. Dynamic parameters such as aerodynamics, heating and cooling fluid flow, temperature effects on the engine, and wind noise are also analysed.

A redesign process begins with an existing object or space. The object or space is modelled with the help of a computer aided design system. Such a model already exists when the original object or space was designed using computer aided design. The model of the existing object or space is modified to change appearance as desired and parameters are verified. In redesigning an automobile to improve aerodynamics—decrease drag—to increase fuel efficiency, a computer model of the automobile as it exists is created. The model is then analysed for aerodynamics. The analysis allows the designers to modify the model of the automobile in order to achieve desired results.

In analysing fluid mechanics, heat and mass transfer, physics, chemistry, solid mechanics, and structural analysis, a "grid" is generated representing a space through which fluid flows or the flux, e.g. of heat, occurs, in order to allow the problem to be discretised for the purposes of numerical calculations on a digital computer. Such grids are known and have been used extensively in design and analysis being also referred to as "cells", "meshes" "elements" and so forth. Unfortunately, generating such grids is time consuming and each time a space or an object such as an aircraft is modified, the grid must be regenerated. Typically, designs requiring analysis using computational fluid dynamics require a 3 stage cycle comprising: grid generation (pre-processing), flow solving, and post-processing. The cycle is repeated a number of times in obtaining a refined analysis of the flow. Further, each stage requires a distinct suite of software.

The dominant type of grid in use today is the structured body-fitted coordinate (BFC) grid composed of quadrilateral (two-dimensional grid) or hexahedral elements (three-dimensional grid) cells. The grid-generation process involves the definition of two or three functions, $\xi^i$, (also denoted by $\xi$, $\eta$, $\zeta$). These are considered a function of the Cartesian components, $x^i$, also denoted by x, y, z, i.e. $\xi^i = \xi^i(x^1, x^2, x^3)$ i=1, 2, 3. Relationships between $(\xi^1, \xi^2, \xi^3)$ and $(x^1, x^2, x^3)$ are often stipulated by means of partial differential equations, $$\frac{D(\xi^1, \xi^2, \xi^3)}{D(x^1, x^2, x^3)} = 0 \tag{1}$$

where the symbol D denotes a differential operator. It is, however, the Cartesian coordinates of the grid-points, $x^i = x^i(\xi^1, \xi^2, \xi^3)$ which are required. Hence, an inverse form $$\frac{D^{-1}(x^1, x^2, x^3)}{D(\xi^1, \xi^2, \xi^3)} = 0 \tag{2}$$

is solved.

A conventional grid generation process involves the use of transfinite interpolation to obtain initial grid values $x^i$. This is then followed by 'relaxation' or 'smoothing' based on the solution of equation 2.

The D-operator is expressible in terms of vector functions so, choice of independent variables is inconsequential and equation 1 may be replaced by a coordinate independent form, $$D(\phi) = 0, \phi = \xi^i \tag{3}$$

Among the simplest and most widely-used grids are those based on Laplace's equation, which in the operator form of equation 3 is, $$D(\phi) = \vec{\nabla} \cdot \vec{\nabla}(\phi) = 0 \tag{4}$$

where $\phi = \xi^1, \xi^2, \xi^3$. A coordinate dependent form of equation 4 is, $$\frac{\partial^2 \xi^i}{\partial x^j \partial x^j} = 0 \tag{5}$$

which is inverted as, $$g^{jk} \frac{\partial^2 x^i}{\partial \xi^j \partial \xi^k} = 0 \tag{6}$$

$g^{jk}$ are the contravariant components of a metric tensor expressed in tensor notation.

Another common set of equations used in grid generation are Poisson's equations, which in the operator form of equation 3 are, $$D(\phi) = \vec{\nabla} \cdot \vec{\nabla} \phi - S = 0 \tag{7}$$

where $S = S^i$ are 'control-functions' also referred to as $S = -(P, Q, R)$. Typically, the inverse of equation 7 is solved. Various physical analogies, e.g. heat conduction with internal sources, can be constructed to provide a phenomenological basis for equation 7. "Control-functions" of the general form $S = -\alpha \text{sign}(\xi - \xi_0) e^{-h|\xi - \xi|}$ may be used to effect surface attractions and have been described in the art. There are, however, disadvantages to the use of exponential control-functions: the presence of two coefficients, a and b, demands a measure of skill on the part of the programmer in order to concentrate grid cells effectively; and convergence is not guaranteed; the solution is potentially unstable. Other "automatic" control-functions based on presumed relations of boundary-orthogonality attempting to control cell distributions away from the boundaries are described in the art. These are not entirely successful in achieving the desired goal.

It would be advantageous to provide a method of grid generation that requires a simple algorithm allowing significant control of grid line locations and improved likelihood of convergence over known methods of grid generation.

OBJECT OF THE INVENTION

Thus in an attempt to overcome these and other limitations of the prior art it is an object of the present invention to provide a method of grid generation for use in computer aided design.

SUMMARY OF THE INVENTION

In a first broad embodiment this invention provides a method of producing a model of space relating to an object comprising the steps of:

a) providing an object model to a computer; and b) generating a reference grid having grid coordinates and nodes disposed at locations relative to the grid coordinates, the reference grid representative of space associated with the object model by the steps of:

providing a set of reference scalars associated with nodes of the reference grid;

providing a current grid having nodes associated with nodes of the reference grid; and, until a determined residual for each node with an associated scalar is within predetermined tolerances, iteratively performing the steps of:

obtaining calculated values associated with nodes on the reference grid but calculated based on associated nodes on the current grid, comparing the calculated values associated with nodes in the reference grid with at least a reference scalar associated with a corresponding node of the reference grid to determine residuals associated with some nodes, and when the residual associated with a node is not within a predetermined tolerance, altering a location of the associated node to reduce the residual by modifying coordinates of the current grid; and, providing the reference grid in dependence upon coordinate locations of the current grid.

In accordance with the invention there is further provided a method of producing a model of space relating to an object comprising the steps of:

a) providing an object model to a computer;

b) generating a reference grid having grid coordinates and nodes disposed at locations relative to the grid coordinates, the reference grid representative of space associated with the object model by the steps of:

providing a set of reference scalars associated with nodes of the reference grid;

providing a current grid having nodes associated with nodes of the reference grid; and, until a determined residual for each node with an associated scalar is within predetermined tolerances, iteratively performing the steps of:

obtaining calculated values for analysis of a characteristic of the object model;

when the analysis is indicative of alterations required of the object model, altering the object model and returning to step (a);

obtaining calculated values associated with nodes on the reference grid but calculated based on associated nodes on the current grid;

comparing the calculated values associated with nodes in the reference grid with at least a reference scalar associated with a corresponding node of the reference grid to determine residuals associated with some nodes;

when the residual associated with a node is not within a predetermined tolerance, altering a location of the associated node to reduce the residual by modifying coordinates of the current grid.

In accordance with the invention there is further provided a method of producing a model of space relating to an object comprising the steps of:

a) providing an object model to a computer; and b) generating a reference grid having grid coordinates and nodes disposed at locations relative to the grid coordinates, the reference grid representative of space associated with the object model by the steps of:

providing a current grid having nodes associated with nodes of the reference grid;

providing a set of reference scalars associated with nodes of the current grid; and, until a determined residual for each node with an associated scalar is within predetermined tolerances, iteratively performing the steps of:

obtaining calculated values calculated based on nodes on the current grid and associated therewith, comparing the calculated values associated with nodes in the current grid with at least a reference scalar associated with a corresponding node of the current grid to determine residuals associated with some nodes, and when the residual associated with a node is not within a predetermined tolerance, altering a location of the associated node by modifying coordinates of the current grid in order to reduce the residual; and, providing the reference grid in dependence upon coordinate locations of the current grid.

BRIEF DESCRIPTION OF THE DRAWINGS

Exemplary embodiments of the invention will now be described in conjunction with the following drawings, in which.

DETAILED DESCRIPTION OF THE INVENTION

Grid-generation involves the stipulative definition of functions, denoted by Greek letters, $\xi^i$ (or alternatively $\xi$, $\eta$, $\zeta$) using differential equations, $$\frac{D(\xi^i)}{D(x^j)} = 0 \qquad (8)$$

where English letters, $x^i$ (or x, y, z), denote Cartesian components. The above equation is sometimes referred to ostensibly as a 'physical-space' formulation. In grid generation, inverse methods are often employed, namely, $$\frac{D(x^i)}{D(\xi^j)} = 0 \qquad (9)$$

i.e., the Cartesian coordinates of the grid are obtained in 'transformed space'. Most schemes are based on inversions of the physical space formulation, however transformed-space formulations have also been proposed. These are known to cause grid-folding.

Figure 1:
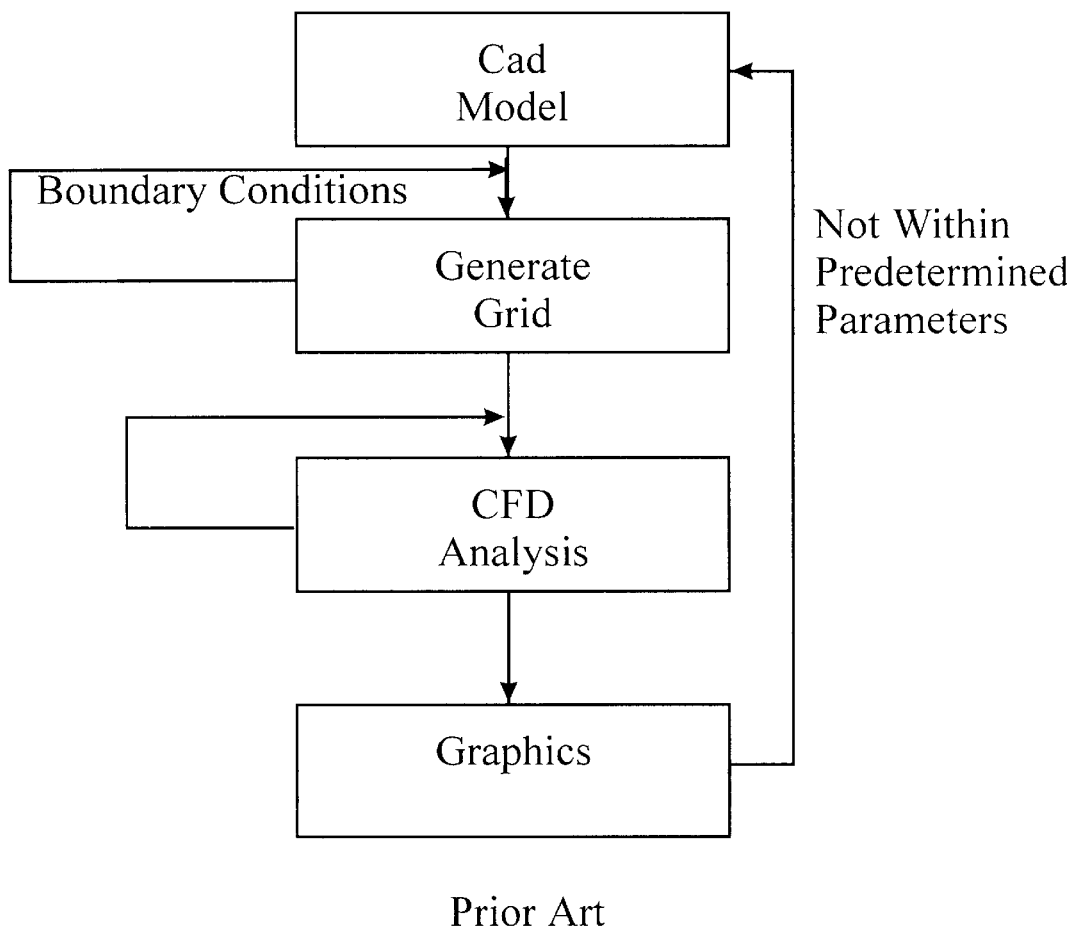
FIG. 1 is a block diagram of a method of designing objects requiring computational fluid dynamic analysis according to the prior art.

Referring to FIG. 1, a method of designing an object using computer aided design and according to the prior art is shown in block diagram. A CAD model in the form of a model of an object or of a space is provided to a computer. Such a model may represent an actual physical object such as a building, a room, an automobile, or an aircraft. Alternatively, such a model may represent a proposed design for such an object or for a process. The CAD model defines surfaces of the object in the form of interior and/or exterior surfaces.

A grid is defined about a surface within the CAD model. In body-fitted coordinate (BFC) grids, grid lines or surfaces fall on the surface within the CAD model. Some of the lines or surfaces within such a grid define the contours of the surface. The grid itself may extend within the object or outside the object when desired. For example grids may be generated simultaneously around the exterior and within the interior cabin-space of an automotive vehicle Some grids are more useful than others, so the grid generation block is iterated until a "good" grid is acquired. Further, the grid enables the computer to carry out computational fluid dynamics analysis of the model. The use of the term computational fluid dynamics is intended in its general sense as applied to object models and process models. Such a grid surface may contain fluid in the form of liquid or gas, solid material, or a combination thereof. Once such analysis is complete, results are compared against predetermined design parameters to ensure compliance. When the results achieve the design parameters, the CAD model is complete. Should the results fail to meet the design parameters, the CAD model or at least another parameter is changed and the method returns to the step of grid generation.

According to the invention, a coordinate independent formulation using vector operators is made. Thus any coordinate system may be employed to obtain a solution. An initial $\xi^{*j}$ grid is generated algebraically, and discretised in physical space. A novel aspect of the method is back-substitution of values of the solved-for $\xi^i$ scalars into the grid, as the solution proceeds.

The governing equations may be parabolic, hyperbolic or elliptic, the latter being popular. First-used elliptic equations were Laplace systems where only a diffusion term is non-zero. These systems satisfy an extremum principle, namely that the mapping be proper; 1—1 and monatonic, boundary-values span the interior. Diffusion-source equations are also widely used. 'Control-functions' are often coded as source terms, in order to alter the position or slope of grid-lines or grid-surfaces. Some known source terms include exponential terms to effect attractions and terms based on the presumption of boundary orthogonality. It will be evident to those of skill in the art, from the description hereinbelow, that many other variations are applicable to the method of the invention.

Figure 2:
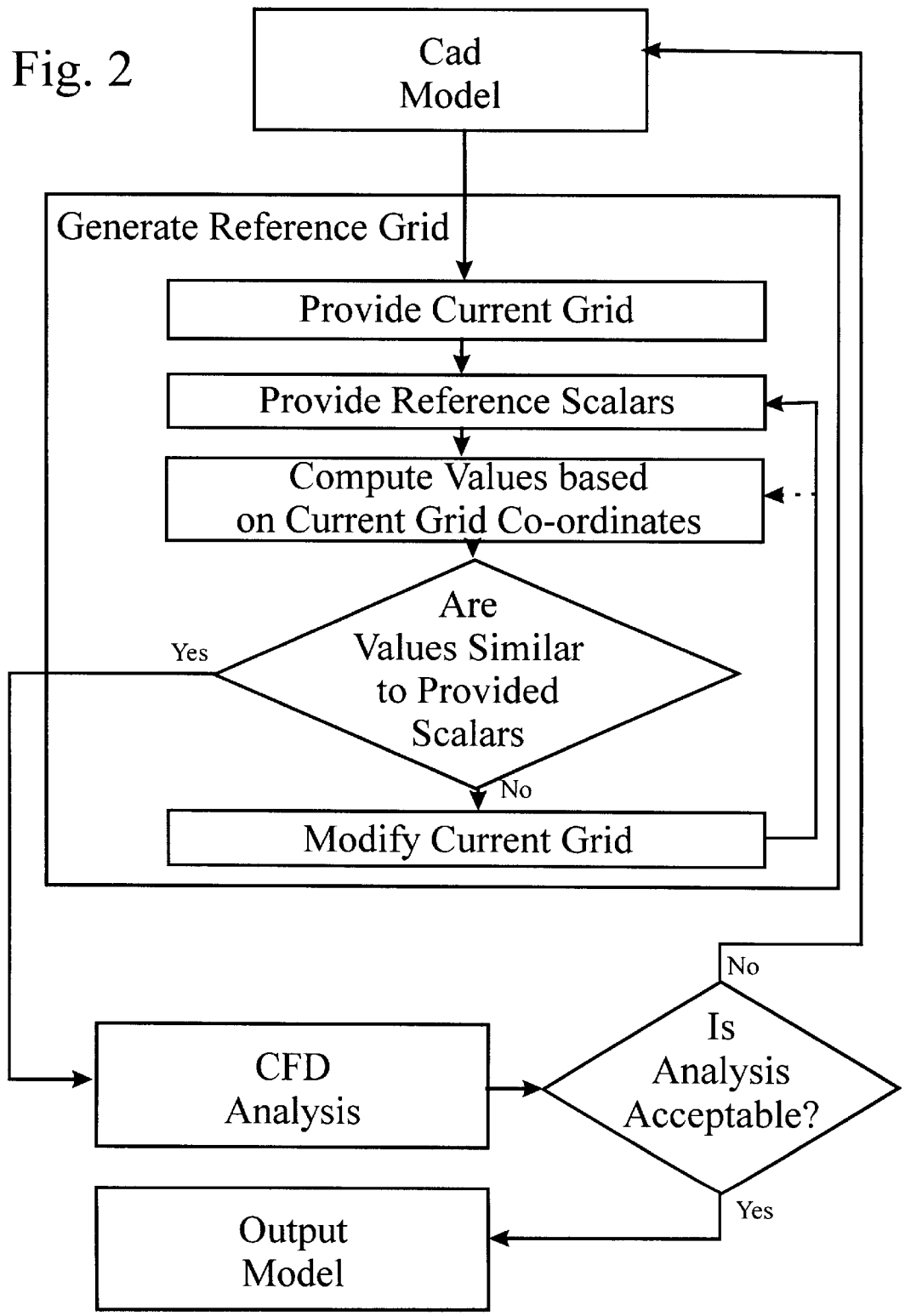
FIG. 2 is a block diagram of a method of designing objects requiring computational fluid dynamic analysis according to this invention.

Referring to FIG. 2, a method of designing an object using computer aided design and according to the present invention is shown in block diagram. A CAD model in the form of a model of an object or of a space is provided to a computer. Like the prior art, such a model may represent a physical object such as a building, a room, an automobile, or an aircraft. Alternatively, such a model may represent a design for such an object. The CAD model defines surfaces of the object in the form of interior and/or exterior surfaces. About such surfaces, flow is to be analysed.

An initial grid is provided as the current grid. A number of iterations are performed to improve the current grid based on previous solution values. Nodal scalars are solved for and compared to reference values when, as shown in dashed line, the reference nodal values are provided as constants. Alternatively reference values may be a function of the current solutionas shown in solid line in the figure. The method is unique in that the grid itself is adapted, based on a comparison of the nodal values of $\phi=\xi$, $\eta$, $\zeta$ with a set of reference values, $\phi_{ref}$. This provides significant advantages as described below.

An initial BFC grid is generated with Cartesian coordinates for point P denoted by $x^*$, $y^*$, $Z^*$. $\xi_{ref}$, $\eta_{ref}$, $\zeta_{ref}$ are reference values at point P in the grid. These are integer values, corresponding to $\Delta\xi=\Delta\eta=\Delta\zeta=1$, or, alternatively, arbitrary values based on the boundary-point distribution. In an embodiment, these values are influenced by intensive properties of the medium such as temperature, pressure, etc.

For example, in analysis of fluid flow around a hot object, most of the information desired from the analysis lies in the physical space adjacent the body. It is therefore preferable to have a higher density of cells in this region. A growing non-linear function based on the solved-for temperature values may prove an adequate selection for generation of the grid. Reference values based on level-values of temperature would locate more cells about the body and far fewer away from it. Of course, analysis may determine that another grid having different distribution is most useful. Using prior art methods, such a determination requires a complete reapplication of the entire method.

Any appropriate governing system of equations may be used for grid generation. One example of a model transformation equation, $D(\phi)=0$, is, $$D(\phi) = \frac{\partial}{\partial t}(\rho\phi) + \vec{\nabla} \cdot (\vec{u}\phi) - \vec{\nabla} \cdot (\Gamma\vec{\nabla}\phi) - S = 0 \tag{10}$$

Equation 10 is a transport equation for a general scalar $\phi$ governing the conservation of momentum, energy, species concentration etc. In this form the source term, S, the convection term $\vec{u}$ and the diffusion coefficient $\Gamma$ are used to control grid lines and/or surfaces. Optionally, other systems of equations are employed for the method described here.

Equation 10, in terms of general curvilinear coordinates, is as follows:

$$\frac{\partial}{\partial t}(\sqrt{g}\,\phi) + \frac{\partial}{\partial \xi^{i*}}\left(\sqrt{g}\,u^i\phi - \sqrt{g}\,g^{ij}\frac{\partial \phi}{\partial \xi^{j*}}\right) - \sqrt{g}\,S = 0 \tag{11}$$

for the case $\rho=\Gamma=1$. The operators represent transient, convection, diffusion and source terms respectively and the operation of differentiation $\partial/\partial\xi^{i*}$, the metric coefficients, $g^{ij}$, and the Jacobian $\sqrt{g}$, all refer to the body-fitted coordinate (BFC) system (i.e. the current grid configuration).

The set of equations 10 is discretised using a known method such as finite-difference, finite-volume or finite-element methods. In the well-known finite-volume method a set of linear algebraic equation $L(\phi)=0$ corresponding to $D(\phi)=0$ is obtained:

$$\alpha_W(\phi_W-\phi_P)+\alpha_E(\phi_E-\phi_P)+\alpha_S(\phi_S-\phi_P)+\alpha_N(\phi_N-\phi_P)+\alpha_L(\phi_L-\phi_P)+$$
$$\alpha_H(\phi_H-\phi_P)+\alpha_T(\phi_T-\phi_P)+S=0 \tag{12}$$

The subscripts W, E, S, N, L, H refer to the west, east, south, north, low, and high neighbours of P, respectively, while T refers to P-values obtained in a previous 'sweep' or 'time-step' (i.e. grid configuration). Linking coefficients in equation 12 are evaluated by considering a combined influence of convection and diffusion, as is well known in the art. Optionally, other schemes such as the finite-element method are employed.

The $\phi$-distributions are independent of the choice of coordinate system (apart from numerical error). Thus $\phi$ is solved for, in a current BFC grid which is an initial guess for a reference grid. Furthermore, the current BFC grid is adaptable during design of the object in order to improve analysis or to improve a design.

When grid locations at P differ from the ultimate location x, y, z, values of $\phi=\xi, \eta, \zeta$, also differ from the desired reference values $\xi_{ref}, \eta_{ref}, \zeta_{ref}$. During each iteration, displacement correction factors x', y', z' are added to the previous value of x*, y*, z*, as follows, $$\vec{r}_p=(x,y,z)_p=\vec{r}_p^*+\alpha\vec{r}_p' \tag{13}$$

where $\alpha$ is a linear relaxation coefficient. The displacement correction factors are calculated from the $\partial x/\partial\xi$'s, at P, namely, $$\vec{r}_p' = (\xi_{ref}-\xi_P)\frac{\partial \vec{r}}{\partial \xi^*} + (\eta_{ref}-\eta_P)\frac{\partial \vec{r}}{\partial \eta^*} + (\zeta_{ref}-\zeta_P)\frac{\partial \vec{r}}{\partial \zeta^*} \tag{14}$$

where, $$\left(\frac{\partial \vec{r}}{\partial \xi^*}, \frac{\partial \vec{r}}{\partial \eta^*}, \frac{\partial \vec{r}}{\partial \zeta^*}\right) = \left(\frac{\vec{r}_E-\vec{r}_W}{\xi_E^*-\xi_W^*}, \frac{\vec{r}_N-\vec{r}_S}{\eta_N^*-\eta_S^*}, \frac{\vec{r}_H-\vec{r}_L}{\zeta_H^*-\zeta_L^*}\right) \tag{15}$$

This ensures that nodal values $\xi, \eta, \zeta$ converge on the reference values. Once converged, a grid has been generated. The above grid-correction equation is unique to the method described herein, obviating the specific need to analytically invert governing equations.

The grid enables the computer to carry out computational fluid dynamics and other analyses of the model. Once such analysis is complete, results are compared against predetermined design parameters to ensure compliance. When the results achieve the design parameters, the CAD model is complete. Should the results fail to meet the design parameters, the CAD model is changed and the method returns to the step of grid generation.

The grid generation procedure may be summarised as follows: transfinite interpolation is used to generate an initial current grid; the remaining steps being as follows: metric coefficients are obtained from grid geometry, and coefficients in linear algebraic equations are calculated; field values of $\xi, \eta, \zeta$ are set to initial values, $\xi_{ref}, \eta_{ref}, \zeta_{ref}$, iterations of the solver applied to obtain new values for $\phi=\xi, \eta, \zeta$; which are then compared to the desired values $\xi_{ref}, \eta_{ref}, \zeta_{ref}$, the $\partial\vec{r}/\partial x, \partial\vec{r}/\partial y, \partial\vec{r}/\partial z$ and current grid correction factors x', y', z' calculated and added to x*, y*, z*. The remaining steps are repeated until satisfactory convergence is obtained. During grid generation, review of a current grid is possible to evaluate grid quality and applicability to a desired analysis. Once convergence occurs, the current grid forms the reference grid. Alternatively, a reference grid is determined based on the current grid.

Grid control is a process of affecting cell density within specific regions of a grid. It is preferable to have higher densities—smaller or thinner cells—concentrated about locations of more information. Such locations are not always known, a priori; sometimes, analysis is required to locate them. Once located, it is preferable to regenerate a grid having cell densities with a desired distribution. Alternatively, further grids are superimposed on previous grids -fine grid embedding. The further grids have higher densities and fill larger cells of previous grids where information would otherwise be lost.

In an embodiment of the invention described herein, grid control is effected by means of convection terms. Alternatively, grid control is effected by means of source terms. Further alternatively, grid control is effected by means of a combination of terms.

A function which is one-to-one over (0,1) is the normalised exponential function, $$\xi^+ = \frac{1 - e^{Pe x^+}}{1 - e^{Pe}} \qquad (16)$$

where the plus sign indicates a normalised value.

Equation 16 is a solution to a 1 dimensional convection-diffusion equation. Pe is a Peclet number i.e. the ratio of convection to diffusion. This exponential function generates a geometric series $\Delta\xi$ 1, s, $s^2$, ... where $s=e^{N_n \Delta x}$ for $\Delta x$=constant. This may be equivalently coded either as a source term or a convection term. Optionally, other stretching functions are defined according to the appropriate bunching laws, as known in the art.

Once the iterations are completed and reference values match values at corresponding grid locations, the current grid is said to be converged and a reference grid is determined therefrom. Fluid dynamics analysis is carried out and the computer aided design model is evaluated. When the model is acceptable the model is complete. When the model is unacceptable, the model is altered and the grid generation and evaluation process re-commenced.

Alternatively, the fluid dynamics analysis is carried out iteratively along with grid generation. Results from said iterative analysis allow for grid adaptation and enhance grid control. The results allow boundary points to be manually or automatically altered in order to improve results of analysis and thereby improve resulting designs.

Some simple two-dimensional grids are used to illustrate the method of this invention. FIGS. 3–6 show a 31×16 O-grid around a NACA 012 airfoil. Radial lines are of constant $\xi$ while the circumferential lines are of constant $\eta$. $\xi$ has been fixed to 1 and nx at $\theta$=0 and $\pi$, while $\eta$ is fixed at the inner airfoil and the outer circular sections, respectively.

Figure 3:
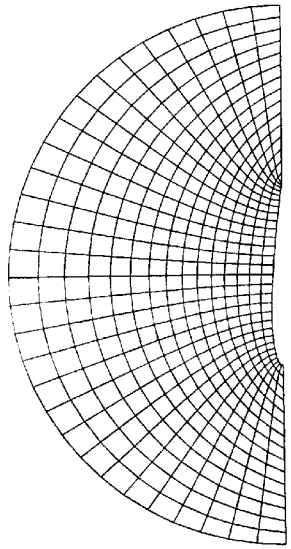
FIG. 3 is a 31×16 O-grid around a NACA 012 airfoil and shows a solution for Laplace's equation, with Dirichlet boundary conditions applied at all boundaries.

FIG. 3 shows a solution for Laplace's equation, with Dirichlet boundary conditions applied at all boundaries, i.e. $\xi$-boundary-points and $\eta$-boundary-points are fixed, with $\xi_{ref}$=1, 2, 3, ... at 0, $\Delta\theta$, $2\Delta\theta$, ... $\pi$ where $\Delta\theta=\pi/(n-1)$ and $\eta_{ref}$=1, 2, 3, ... at $r_0$, $r_0+\Delta r$, $r_0+2\Delta$ r ... etc.

Figure 4:
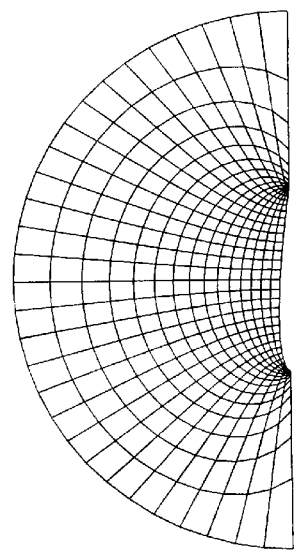
FIG. 4 is a 31×16 O-grid around a NACA 012 airfoil and illustrates that by prescribing $\eta_{ref}=1, 2, 3, \ldots$ at points which are themselves concentrated in a geometric progression $\Delta r=1, s, s^2, \ldots$ grid lines are concentrated at front and rear edges of the airfoil.

FIG. 4 shows that by prescribing $\eta_{ref}$=1, 2, 3, ... at points which are themselves concentrated in a geometric progression $\Delta r$ 1, s, $s^2$, ... gridlines are concentrated at front and rear edges of the airfoil. There is, however, little improvement to distribution elsewhere, e.g. along the airfoil section.

Figure 5:
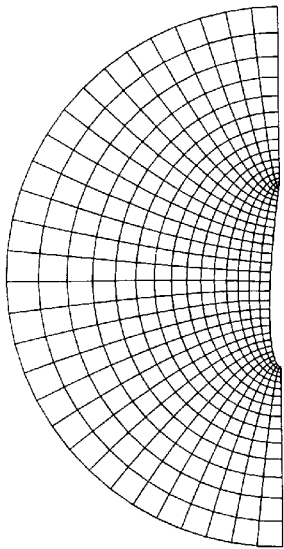
FIG. 5 is a 31×16 O-grid around a NACA 012 airfoil and shows a solution for Laplace's equation, with Neumann boundary conditions applied, and $\Delta\xi_{ref}=\Delta\eta_{ref}=1$.

FIG. 5 shows a solution for Laplace's equation, with Neumann boundary conditions applied, and $\Delta\xi_{ref}=\Delta\eta_{ref}=1$. Grid nodes were allowed to slide until $\xi=\xi_{ref}$ and $\eta=\eta_{ref}$. The grid is now orthogonal.

Figure 6:
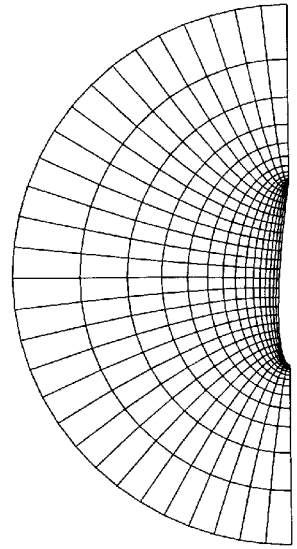
FIG. 6 is a 31×16 O-grid around a NACA 012 airfoil and illustrates that by applying an inward 'convection-flux' using a convection-diffusion formulation effective grid control of $\eta$-lines is possible.

FIG. 6 shows that by applying an inward 'convection-flux,' effective grid control of $\eta$-lines is possible. It can be seen that grid cells are concentrated in an airfoil boundary layer in a desirable fashion. Alternatively, grid cells are concentrated at leading and trailing edges of an airfoil through a similar method..

Figure 7:
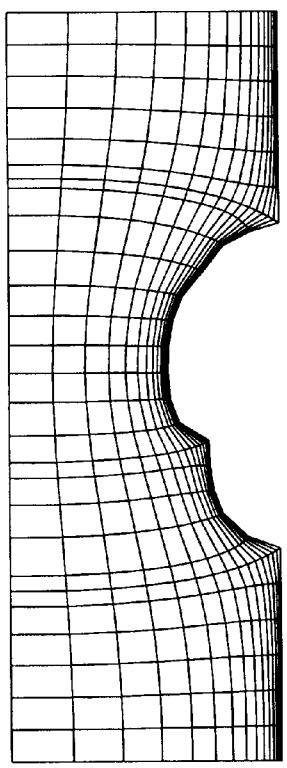
FIG. 7 is an H-grid around a 2D vehicle and shows the solution to Laplace's equation.

Further use of control functions is illustrated in FIGS. 7–10. These show an H-grid around a two-dimensional vehicle. FIG. 7 shows the solution to Laplace's equation ($v_0$=0). The grid lines are coincident with stream-lines and parallel to iso-potentials for streaming potential-flow. Values of $\eta$-lines (stream-lines) were allowed to slide at both west and east boundaries with $\eta_{ref}$=1, 2, 3, ... as above. $\xi$-values, parallel to the iso-potentials, were allowed to slide at a north boundary, but were fixed at a south boundary. This was achieved by setting $\xi_{ref}$ values to current nodal values at the south boundary corresponding to j=1 (i.e. the car surface). The $\eta$-lines diverge at front and rear stagnation points 2. This is a problem typical of H-grids.

Figure 9:
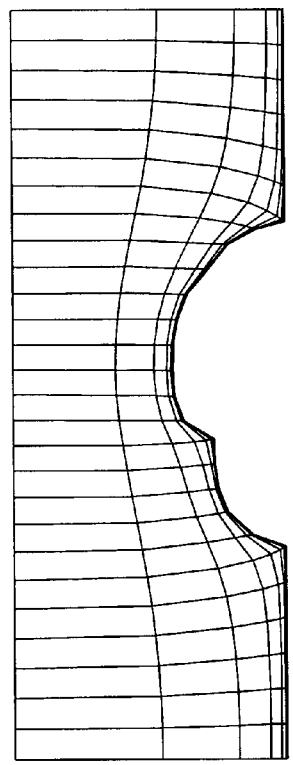
FIG. 9 is an H-grid around a 2D vehicle with increased convection flux $v_0=-0.3$.
Figure 8:
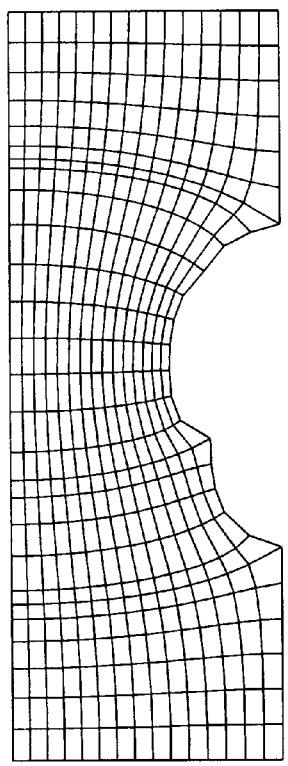
FIG. 8 is an H-grid around a 2D vehicle based on a convection-diffusion formulation with $v_0=-0.5$ used to control the grid lines.
Figure 10:
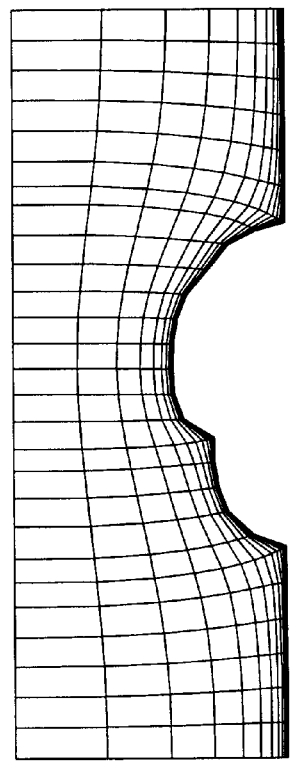
FIG. 10 is an H-grid around a 2D vehicle with $v_0=-1.0$.

FIGS. 8–10 show the effects on the $\eta$-lines of progressively increasing a magnitude of the convection-flux term, $v_0$. FIGS. 8–10 reveal that, optionally, convective terms are used to control grid-lines in a stable and predictable fashion. When magnitude of $v_0$ is increased as shown in FIGS. 8 and 9 the $\eta$-lines become concentrated in the boundary layer around the vehicle. FIG. 10 shows that a solution is highly stable even when the grid-lines are almost all concentrated in the boundary layer. Further, vertical $\xi$-lines are unaffected by values of $v_0$. Because $\xi$ and $\eta$ are solved for independently, they are controlled in an independent fashion. Of course, different methods of solving for $\eta$-lines and for $\xi$-lines are applied when desirable.

In an embodiment of the method of the present invention, boundary conditions are prescribed as linear source terms $S=C(\phi_{ref}-\phi P)$ in finite-volume equations. Alternatively, sliding or zero-gradient boundary conditions or fixed values are used.

According to the present invention, grids normally require two fixed values in each direction, for instance $\xi$ may be fixed at the E and W faces, $\eta$ at the S and N faces, and $\zeta$ at the L and H faces. Values of $\xi$ at the S, N, L, H; $\eta$ at the E, W, L, H; and $\zeta$ at the E, W, S, N surfaces may either be fixed or be allowed to slide. There is no problem in prescribing either of these conditions; the Neumann condition is the default (S=0), while in-cell values of $\phi$ may be fixed to $\phi_{ref}$, by means of a suitably large coefficient, C. Alternatively, a multi block method is used across shared surfaces in a fashion analogous to that known in the art.

A choice of reference values for $\xi$, $\eta$, $\zeta$ is selected from fixed integer values such as 1, 2, 3, ... nx, corresponding to $\Delta\xi$=constant; non-integer values, e.g. a geometric progression; actual in-cell values at a boundary or interior location, obtained as part of an iteration; or some other desirable valuables.

Boundary conditions are applied in a number of different ways. In 2 dimensions $\xi$-points slide at both the N and S boundaries (Neumann boundary conditions) see FIGS. 5–6; $\xi$-points are fixed at a boundary but remain free to slide at another boundary (see FIGS. 7–10); or $\xi$-points are fixed at both N and S boundaries, see FIGS. 3–4. The extension to 3 dimensions is possible.

Use of convection-functions or source-terms for grid-control is best combined with Neumann boundary conditions: When grid-lines can slide freely at both ends as shown in FIGS. 5 and 6, iso-$\xi$ lines corresponding to $\xi_{ref}$=1,2,3 ... or other suitable values are generated. Under these circumstances, control-functions concentrate grid-lines by manipulating the actual $\xi$-functions. Alternatively, similar results are achieved by prescribing $\xi_{ref}$ as non-integer values, according to an appropriate bunching law and creating a grid which is parallel to $\xi$-function, but of arbitrary distribution.

When the grid is fixed at an end, but free at another iso-$\xi$ lines are generated with arbitrary $\Delta\xi$'s. Control-functions cannot be used to concentrate grid-lines. Under these circumstances $\xi_{ref}$ is set to current in-cell value of $\xi$, at a fixed boundary. Alternatively, $\xi_{ref}$ may be fixed to equal 1,2,3, ... and generate a single source term at one end only. Note that boundary $\xi$-values need not be fixed in the linear algebraic equation 12. The x-locations of the free-end slide to an appropriate position corresponding to constant $\xi=\xi_{ref}$. Convection-functions or source-terms suitable for altering $\xi$-distribution have different values at either end.

When the grid is fixed at both ends, iso-$\xi$ values are generated although differently (compare FIGS. 3 and 5). The in-cell values of $\xi$ are fixed at one or more boundaries, in order that a single consistent $\xi_{ref}$ be employed along a given line. In the event that these reference values are chosen as 1, 2, 3, ... nx as in FIG. 3 the solution obtained is that which would arise from a conventional inverse solution procedure. Convection and source terms are not used to move grid lines around in a gross fashion but to generate orthogonal grid lines/surfaces at a boundary. Under these circumstances at least one boundary is orthogonal.

In the context of a Dirichlet problem, control-functions are normally designed to satisfy a condition of orthogonality at all boundaries. For problems involving fixed grid-points around arbitrary curved surfaces, control-functions are prescribed that procure orthogonality at boundaries. Previously, explicit geometric constraints were imposed in the inverse forms. According to the present invention, it is desired not only that there be zero-flux along boundaries in a direction, but also that the nodal values are fixed at the boundaries. According to the present invention, at the end of each 'sweep' in the grid generation procedure, the source term is re-computed as, $$\sqrt{g}\, S = \sqrt{g}\,(S^* + S') \qquad (17)$$

The current value of S being taken as S* for the next cycle etc. The correction factor, S', is obtained using, $$\sqrt{g}\, S' = C(\xi - \phi_P) \qquad (18)$$

where $\phi_P$ is the current nodal value and $\xi=1,2,3,\ldots n$ are desired reference values. This ensures convergence on a reference value while, at the same time, ensuring that a zero-flux boundary condition is imposed. No grid correction is applied here—the boundary point distribution is fixed to initial locations. The source terms, S, are evaluated along both boundaries, interior values being interpolated as described above. The coefficient C is fixed to the value of the linking coefficient opposite to the 'missing' boundary (e.g. $\alpha_N$ at the S boundary etc.). Alternatively, the coefficient C is not fixed.

Figures 11A, 11B:
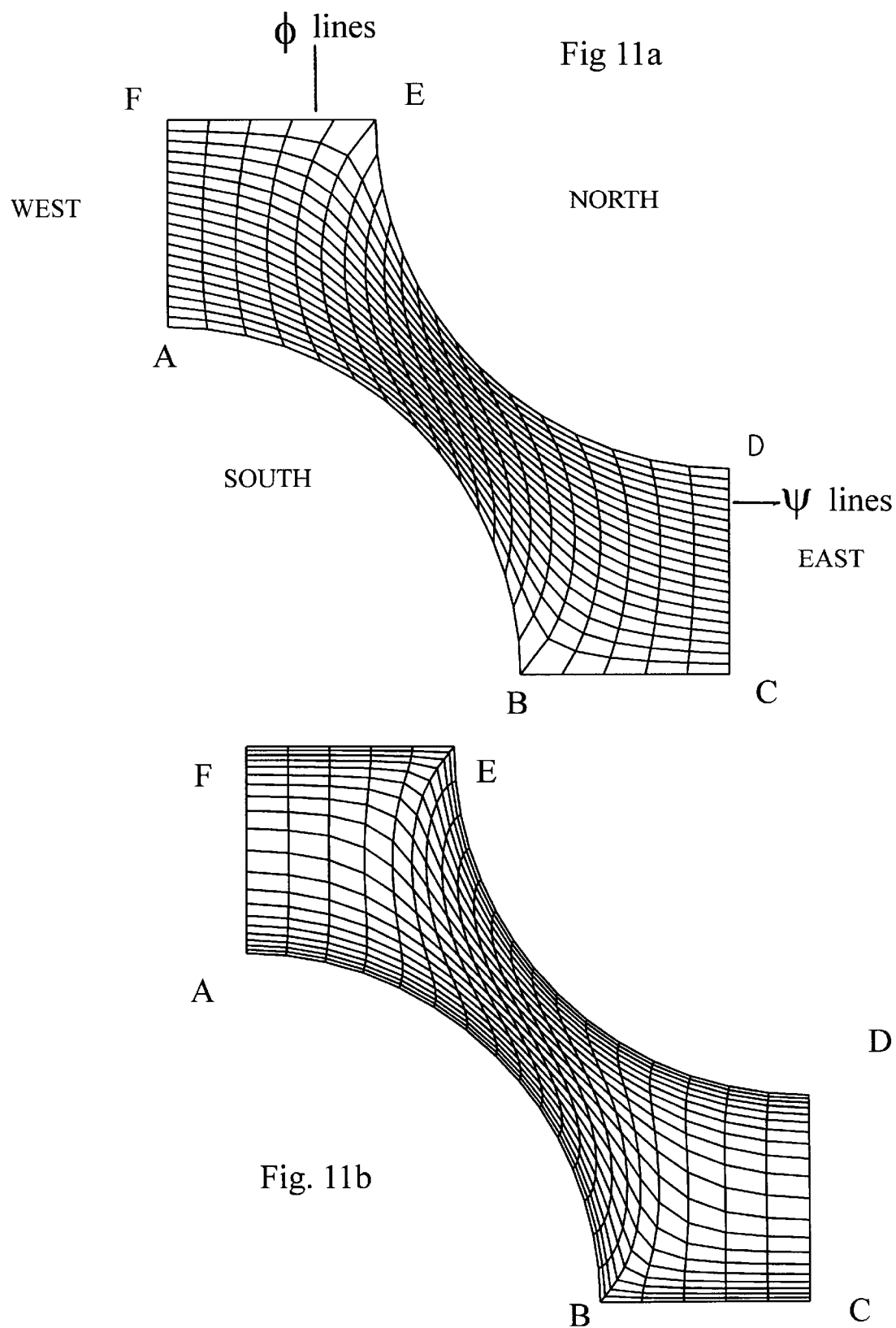
FIG. 11a is a grid around a cylinder with fixed boundary points.
FIG. 11b is a grid around a cylinder with fixed boundary points where orthogonality is maintained; at the boundaries.

FIGS. 11a and 11b show a grid in a tube bank with small pitch-to-diameter ratio. FIG. 11(a) shows a Laplace solution absent modification of source terms. Values of $\phi$ were fixed to 1,2,3, ... n along south (ABC) and north (DEF) boundaries, using a large coefficient. Because initial grid locations at north and south boundaries are incompatible with a 'natural' solution, there is a high degree of non-orthogonality both in the interior of the grid and at the boundaries.

FIG. 11(b) shows that by introducing source terms, it is possible to procure orthogonality at the boundaries, in spite of the high degree of shear in the body of the grid itself. As discussed above, nodal values of $\phi$ along the south and north boundaries (ABC and DEF) were not fixed using a large coefficient, but were solved-for using the finite-volume procedure. The boundary points themselves were fixed. A similar procedure allowed the $\eta$ distribution to be concentrated along the east (AF) and west (CD) boundaries, and at the same time ensure orthogonality.

When implementing Neumann (sliding) boundary conditions, the grid correction procedure is modified to allow the (x,y,z) coordinates at the boundary locations to slide subject to a geometrical constraint, $\xi(x,y,z)$=constant. This is achieved by locating the point on the $\xi$-surface which is a minimum distance from a point $(x^*+x',y^*+y',z^*+z')$. While all necessary surface geometry-information must be available in order to generate an initial grid, in practice, development of a general-purpose boundary-point-sliding procedure suitable for application to complex shapes is not trivial. Moreover there may be additional constraints requiring the grid to pass through specific points such as the leading and trailing edges of a car body. Much can be achieved by dividing the domain into sub-domains or zones; however, there will be situations where Dirichlet boundary conditions must be used. A feature of the method above is that, because it is not an inverse procedure, field values $\phi=\xi$, $\eta$, $\zeta$ are available. Thus it is possible to look at the solution to the Neumann problem, by solving equation 12 in a fixed initial grid configuration, without ever implementing a grid correction procedure. Plots of iso-$\phi$ values give a good indication of where boundary points should be located.

When a fully-converged solution for $\xi$, $\eta$, $\zeta$ is obtained, grid adaptation results in only minor changes to the solution, provided field-values are re-interpolated. At the other end of the scale, by appropriate choice of the false time-step factor, $\alpha_T$, in equation 12, it is possible to decrease the number of iterations to 1, i.e. convert the implicit procedure to a fully-explicit scheme, entirely eliminating the inner loop. Under these circumstance the linear relaxation factor in the grid correction procedure can normally be set to unity, $\alpha=1$. In general, convergence was found to be most rapid when just a few (around 5) grid generation iterations were performed.

The above procedure was found to converge without difficulty. It is easy to implement in a conventional finite-volume approach combined with a grid correction procedure.

An advantage of the non-inverse grid-generation procedure is that since it uses a similar algorithm as conventional flow solvers, it is possible to use the same computer program to generate solutions used in generating the grid and to solve the flow-field. The method described herein, with a few alterations, is applicable to conventional cell-centred finite-volume procedures. These alterations are evident to those of skill in the art. For example, codes designed to handle multi-block and fine-embedded grids as well as multi-grid solvers are modified to generate useable solutions.

Solution-adaptive grids are generated, with solutions to $\xi$, $\eta$, $\zeta$ generated at the same time as p, u, v, w; As such grid generation and the flow-field solution are generated concurrently. Use of a convection term proportional to grad $\phi$ is one example of grid adaptation. These and other functions are attenuated or filtered according to predetermined criteria such as the field-values of pressure gradient, entropy etc., as the solution proceeds. Grid-lines are added as necessary. The grid is, thereby, concentrated towards shock-fronts, and other regions of interest.

Figure 12A:
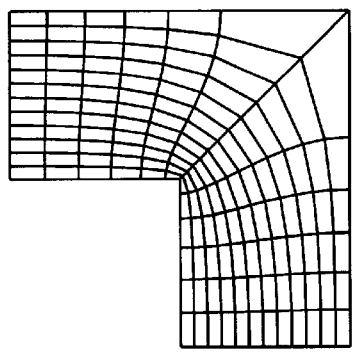
FIG. 12a shows a Laplace-type O-grid with Neumann (sliding) boundary conditions.
Figure 12B:
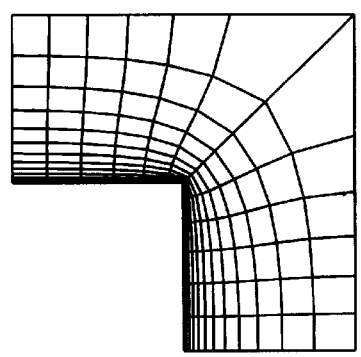
FIG. 12b shows a Poisson-type (Diffusion-source formulation) O-grid with exponential source term used to concentrate cells at the lower wall.
Figure 12C:
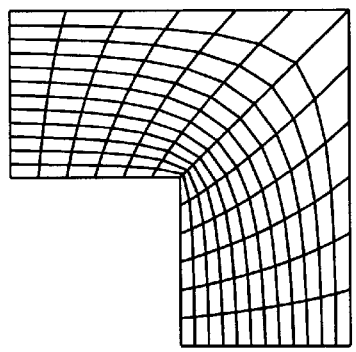
FIG. 12c shows a Laplace-type grid with Dirichlet (fixed) boundary conditions.
Figure 12D:
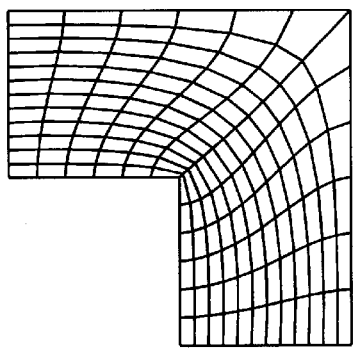
FIG. 12d shows a Diffusion-source formulation with source terms introduced to generate orthogonality at the boundaries.

FIGS. 12a–12d show four elementary O-grids. FIG. 12a is a Laplace system corresponding to the mixed boundary-value problem with $\Delta\xi_{ref}=\Delta\eta_{ref}=1$. In FIG. 12b $\eta$ cells have concentrated. This is achieved by one of two equivalent methods—by introducing a non-linear source term, S, for example as, $$S = \left(\frac{n-1}{L^2}\right) \times \frac{(e^{Pe}-1)^2}{Pe} \exp\left(-2Pe\eta_P - \frac{1}{n-1}\right) \qquad (19)$$

where L is a length scale, n−1 is the number of cells in the $\eta$-direction, and Pe controls the distribution. The same end is achieved by varying reference values. i.e. by prescribing $\eta_{ref}$ as a set of non-integer values. FIG. 12c shows a Dirichlet-Laplace system for $\Delta\xi_{ref}=\Delta\eta_{ref}=1$. FIG. 12d demonstrates the use of variable source terms to obtain boundary orthogonality. These were prescribed iteratively according to Eq. 18 Interior source terms were interpolated from boundary-sources, weighted according to the Jacobian, $\sqrt{g}$.

Figure 12E:
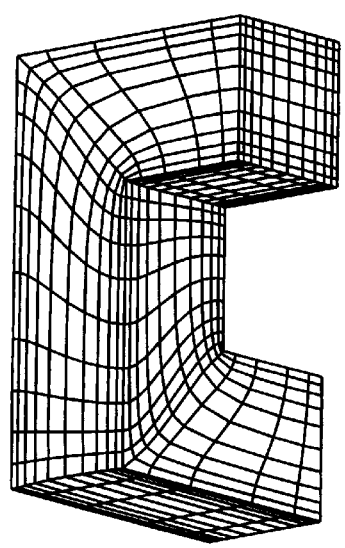
FIG. 12e shows a three-dimensional grid similar to the previous two-dimensional cases.
Figure 12F:
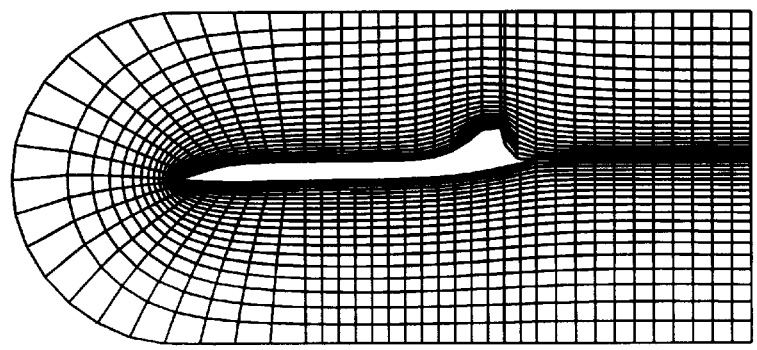
FIG. 12f shows an O-type grid around an aircraft.
Figure 12G:
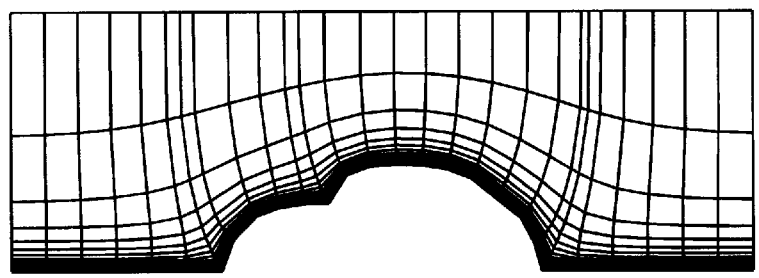
FIG. 12g shows an H-grid similar to FIG. 8 generated using a diffusion-source formulation.
Figure 12H:
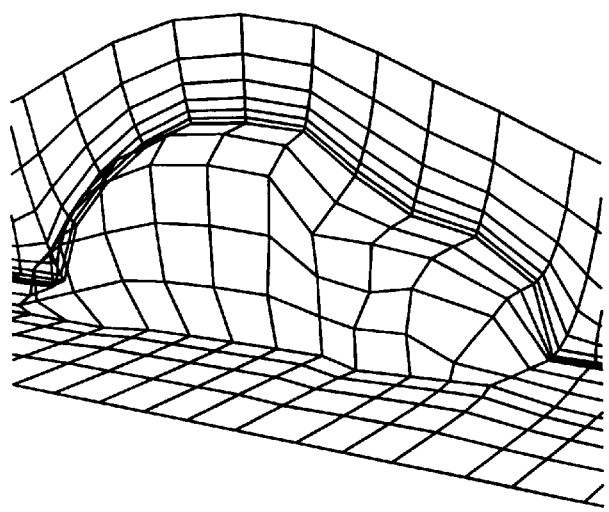
FIG. 12h shows a 3D H-grid around an automobile.
Figure 12I:
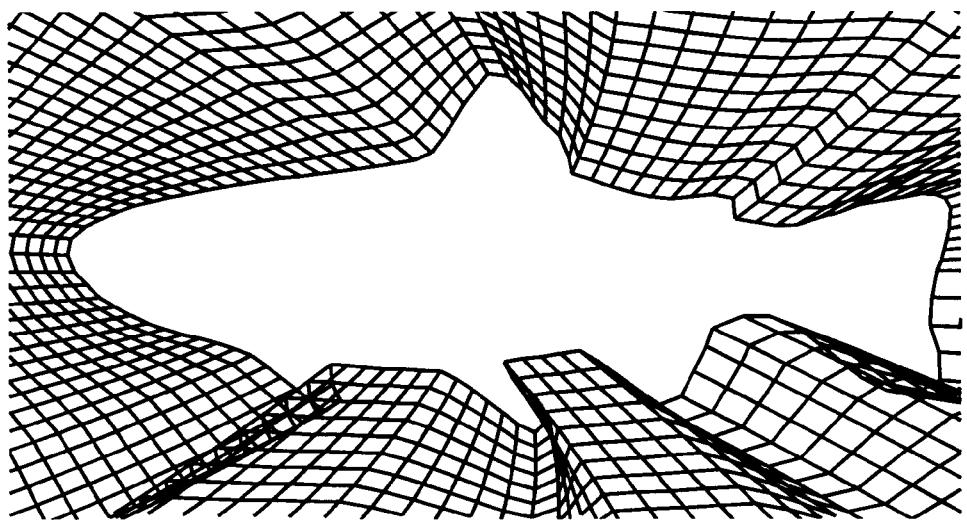
FIG. 12i shows an initial grid around a fish, the algebraically-generated grid is folded in a number of regions; and, FIG. 12j shows that by applying grid generation method, the grid has been unfolded and concentrated in the boundary layer around the surface.
Figure 12J:
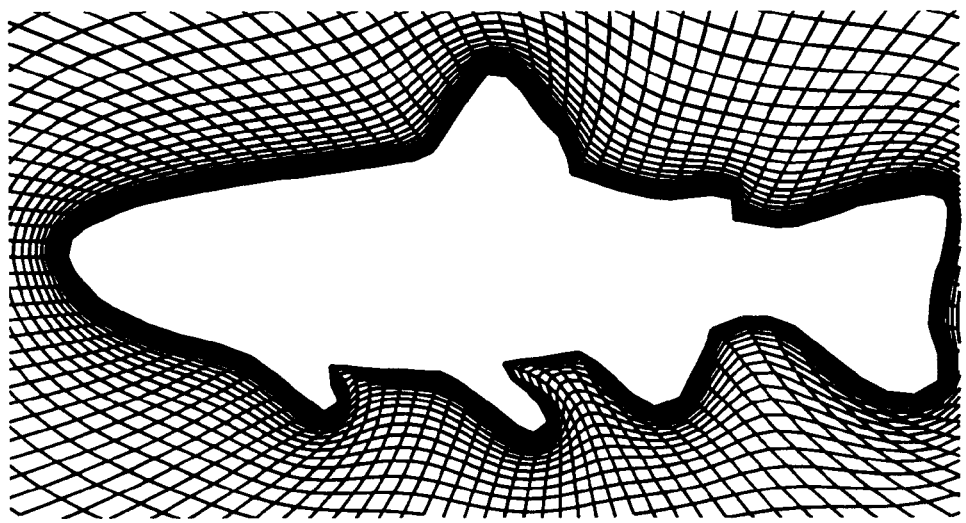

FIG. 12e is a diagram of a 3D bend, where variable source terms are prescribed, for fixed values along the 4 bounding lines of each Neumann surface. In FIG. 12f a C-grid around an aircraft is shown. Only η was solved as a Dirichlet problem, ξ lines are algebraically-generated initial values. FIG. 12g shows an H-grid over a 2D car body. The grid was allowed to slide at the upper boundary, but fixed at the lower wall; $\xi_{ref}$ values were set to $\xi_P$ at j=1. FIG. 12h is a similar grid to that of FIG. 12g, but in 3D. An initially-folded O-grid shown in FIG. 12i is unfolded and concentrated using the above procedure. The result is shown in FIG. 12j Although most of the illustrative examples are simple single-block two-dimensional and three-dimensional problems, the method is extensible to complex shapes and geometries, multi-block grids, and unstructured grids..

The above examples demonstrate grid generation by means of the invention. Alternatively, in accordance with the method control-functions are coded as source-terms, convection-diffusion formulation, variable Γ diffusion coefficients, or other mechanisms. A significant advantage of the invention is that each variable may be treated independently.

Numerous other embodiments may be envisaged without departing from the spirit and scope of the invention.

What is claimed is:

1. A method of producing a model of space relating to an object comprising the steps of:
    a) providing an object model to a computer; and
    b) generating a reference grid having grid coordinates and nodes disposed at locations relative to the grid coordinates, the reference grid representative of space associated with the object model by the steps of:
        providing a current grid having nodes associated with nodes of the reference grid;
        providing a set of reference scalars associated with nodes of the current grid; and,
        until a determined residual for each node with an associated scalar is within predetermined tolerances, iteratively performing the steps of:
            obtaining calculated values calculated based on nodes of the current grid and associated therewith,
            comparing the calculated values associated with nodes of the current grid with at least a reference scalar associated with a corresponding node of the current grid to determine residuals associated with some nodes, and
            when the residual associated with a node is not within a predetermined tolerance, altering a location of the associated node by modifying coordinates of the current grid in order to reduce the residual; and,
    providing the reference grid in dependence upon coordinate locations of the current grid.

2. A method of producing a model of space relating to an object as defined in claim 1, wherein the scalars are indicative of at least one of desired iso-surfaces and desired iso-surface locations.

3. A method of producing a model of space relating to an object as defined in claim 2, comprising the step of iteratively analysing the desired iso-surfaces to determine an approximate solution and modifying the scalars until an approximate solution having predetermined characteristics is achieved.

4. A method of producing a model of space relating to an object as defined in claim 3, wherein a predetermined characteristic is convergence of the approximate solution.

5. A method of producing a model of space relating to an object as defined in claim 1, wherein the step of providing a current grid comprises providing an associated node of the current grid for each node of the reference grid.

6. A method of producing a model of space relating to an object as defined in claim 1, wherein the step of providing a set of reference scalars comprises providing an associated reference scalar for each node of the current grid.

7. A method of producing a model of space relating to an object as defined in claim 1, wherein the step of providing a set of reference scalars comprises providing a set of associated reference scalars for each node of the current grid, one scalar in each set associated with each dimension of the current grid.

8. A method of producing a model of space relating to an object as defined in claim 7, wherein the step of obtaining calculated values based on nodes of the current grid is performed by calculating scalars along each dimension of the current grid in dependence upon each node location.

9. A method of producing a model of space relating to an object as defined in claim 8, wherein the step of obtaining calculated values based on associated nodes of the current grid is performed using different equations for solving for scalars along at least two dimensions of the current grid.

10. A method of producing a model of space relating to an object as defined in claim 1, wherein nodes are located at substantially same locations as grid coordinates.

11. A method of producing a model of space relating to an object as defined in claim 1, wherein nodes are spaces having a same dimensionality as the current grid and are defined by a plurality of adjacent coordinates of the grid.

12. A method of producing a model of space relating to an object as defined in claim 1 comprising the step of using said computer means analysing the flow within said space.

13. A method of producing a model of space relating to an object as defined in claim 12 further comprising the step of until the object model defines an object within predetermined parameters, modifying the object model and iterating the method.

14. A method of producing a model of space relating to an object as defined in claim 1 wherein the current grid is provided using transfinite interpolation.

15. A method of producing a model of space relating to an object as defined in claim 1 wherein the step of generating a reference grid comprises the step of altering boundary conditions of the current grid in dependence upon at least one of calculated values and determined residuals.

16. A method of producing a model of space relating to an object as defined in claim 1 wherein step of generating the reference grid comprises the step of grid adaptation in dependence upon at least one of calculated values and determined residuals.

17. A method of producing a model of space relating to an object as defined in claim 1 wherein the calculated values are determined using a same algorithm as is used by a flow solver.

18. A method of producing a model of space relating to an object as defined in claim 1 wherein step of generating the reference grid comprises the step of calculating a flow field solution.

19. A method of producing a model of space relating to an object comprising the steps of:
    a) providing an object model to a computer; and
    b) generating a reference grid having grid coordinates and nodes disposed at locations relative to the grid coordinates, the reference grid representative of space associated with the object model by the steps of:

providing a set of reference scalars associated with nodes of the reference grid;

providing a current grid having nodes associated with nodes of the reference grid; and, until a determined residual for each node with an associated scalar is within predetermined tolerances, iteratively performing the steps of:

obtaining calculated values associated with nodes of the reference grid but calculated based on associated nodes of the current grid, comparing the calculated values associated with nodes of the reference grid with at least a reference scalar associated with a corresponding node of the reference grid to determine residuals associated with some nodes, and when the residual associated with a node is not within a predetermined tolerance, altering a location of the associated node to reduce the residual by modifying coordinates of the current grid; and, providing the reference grid in dependence upon coordinate locations of the current grid.

20. A method of producing a model of space relating to an object comprising the steps of:

a) providing an object model to a computer;

b) generating a reference grid having grid coordinates and nodes disposed at locations relative to the grid coordinates, the reference grid representative of space associated with the object model by the steps of:

providing a set of reference scalars associated with nodes of the reference grid;

providing a current grid having nodes associated with nodes of the reference grid; and, until a determined residual for each node with an associated scalar is within predetermined tolerances, iteratively performing the steps of:

obtaining calculated values for analysis of a characteristic of the object model;

when the analysis is indicative of alterations required of the object model, altering the object model and returning to step (a);

obtaining calculated values associated with nodes of the reference grid but calculated based on associated nodes of the current grid;

comparing the calculated values associated with nodes of the reference grid with at least a reference scalar associated with a corresponding node of the reference grid to determine residuals associated with some nodes;

when the residual associated with a node is not within a predetermined tolerance, altering a location of the associated node to reduce the residual by modifying coordinates of the current grid.

\* \* \* \* \*